July 26, 1932. S. TACHIKAWA 1,868,955
PROCESS OF RECOVERING CAUSTIC SODA FROM WASTE LYE
Filed Dec. 5, 1930
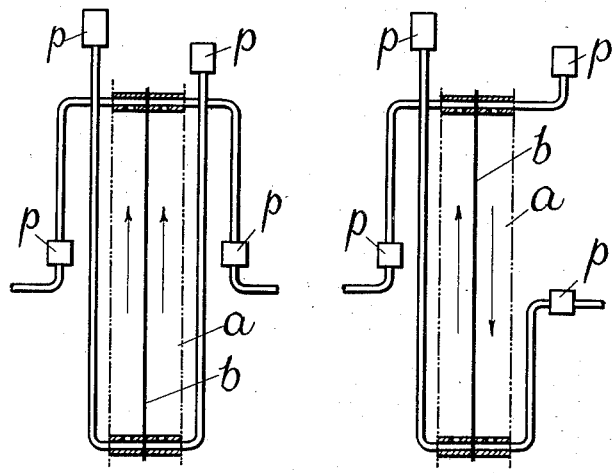
Fig. 2  Fig. 1
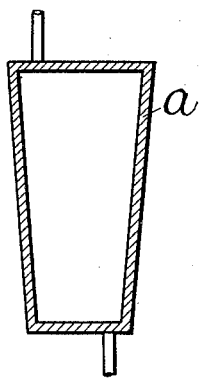 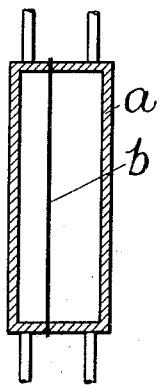
Fig. 4  Fig. 3
Inventor:-
Shozo Tachikawa
by
Attys.

Patented July 26, 1932

1,868,955

UNITED STATES PATENT OFFICE

SHOZO TACHIKAWA, OF SHIGA, JAPAN, ASSIGNOR TO ASAHI KENSHOKU KABUSHIKI-KAISHA, OF KITAKU, OSAKA, JAPAN, A CORPORATION OF JAPAN

PROCESS OF RECOVERING CAUSTIC SODA FROM WASTE LYE

Application filed December 5, 1930, Serial No. 500,357, and in Japan December 17, 1929.

It is a well known fact that waste lye or soda solution liberated in the preparation of viscose by treating cellulose can be refined by dialyzation, wherein waste caustic soda solution and water, with or without an addition of a little quantity of alkali, flow vertically in the same or counter direction on each side of a membrane such as parchment paper. This invention is characterized by addition of a pressure to either side of the liquids relative to the other, so as to counterbalance the osmotic pressure which acts upon the membrane. It has for its object to remove external strain from the membrane so that thickness of the membrane can be minimized and efficiency of dialyzation is promoted.

The accompanying drawing shows diagrammatically the directions of flow and shapes of the liquids adopted in carrying out this invention. Fig. 1 is an example of a counter flow apparatus, while Fig. 2 is a parallel flow one, each having equal and unchanging width of liquids. Figs. 3 and 4 show two examples of different widths of the liquids, one having different but unchanging widths, while the other changes its width from top to bottom. Fig. 4 shows the section on a plan parallel to the membrane.

In a dialyzing apparatus each part of the membrane is subjected to a pressure due to osmotic action of the liquids as well as pressures due to difference of densities and difference of velocities of flow of the same, thus a certain strength or thickness of the membrane is required to resist the unbalanced pressure, notwithstanding the thicker the membrane the worse the dialyzing efficiency.

According to this invention a pressure equal to the unbalanced one is given to either of the liquids relative to the other so as to counter-balance the unbalanced pressure, so that the membrane is subjected to the least strain. On account of this fact the thickness of the membrane can be reduced to the minimum so that the dialyzing efficiency is promoted, the life of the membrane is longer, and the quantity of hemicellulose remaining in the purified liquid is diminished.

The required pressure to counterbalance the osmotic one is effected by statical pressure and velocities of the liquids, which are controlled by means of the devices by which the liquids flow in the dialyzing vessel. In carrying out this invention, a parchment paper $b$ is vertically stretched in a vessel $a$ as shown in Figs. 1 and 2, and entrance and exit pipes are provided at the top and bottom of the vessel on each side of the membrane.

Waste lye and water, with or without an addition of a little quantity of alkali, are admitted to the vessel on each side of the membrane, and flow out therefrom by means of pumps $p$, stand-pipes with hydrostatical heads, and any other convenient devices. The flows of the liquids may be either in the same or counter direction, and the pressures to be given to each side of the membrane should be maintained constant corresponding to the dialyzing capacity of the membrane used and to the difference of densities of the liquids, and the difference of velocities of the liquids at the entrance and exit of the vessel should be maintained constant relative to the velocity of dialyzation under the given pressures of the liquids.

In case the difference of densities of the liquids is large, for example 16%, and a parchment paper of 0.09 mm. thickness is used as a membrane, the pressures of waste lye and alkaline water should be 40 mm. and 60 mm. respectively, and the difference of velocity should be 20% to 25%. In case the difference of densities of the liquids is little, for example 2%, and the same paper as above is used, the pressure of the liquids should be 10 mm. and 15 mm. respectively and the difference of velocities should be 5 to 10%. It is preferable that the quantity of waste lye to be sent to the vessel should be 1400 cc. to 1500 cc. and 500 cc. to 800 cc. per hour per sq. meter of the membrane for the first and second examples above mentioned, respectively.

If a thicker paper such as 0.18 mm. in thickness is used in the above examples, the difference of velocities should be decreased as low as 3% to 5%, and the velocities of liquids should be maintained little in view of decrease of dialyzing velocity of the membrane.

In this manner the membrane is subjected to little external stress so that its thickness can be minimized and its effect of dialyzation is largely increased. When purified lye is required to be in a large quantity of small density as less than 10%, it is advisable to have the flows in the same direction as shown in Fig. 2, while a small quantity of a large density as more than 10% is required, flows of liquids in counter direction as shown in Fig. 1 is advisable to be adopted. In either instance, the quantity of hemicellulose contained in the purified liquid is less than 0.02%.

If, however, an equilibrium of pressure on each part of the membrane is scarcely attained, any of the following means will give a good result.

1. When pressures of the liquids do not correspond with the required velocity-difference, the position of the membrane should be moved toward a side so as to obtain different widths of liquids in the vessel on each side of the membrane, so that the difference of contact-time of the liquids with the membrane can be easily changed and the required difference of velocities corresponding to the pressures of the liquids is obtained.

2. When difference of pressure of the liquids does not correspond with the velocity of dialyzation, the density of the alkaline water originally admitted to the vessel should be raised up to 1%. Then osmotic pressure, weight and velocity of the water are locally changed, and good result is obtainable.

3. When pressures of the liquids do not correspond with the difference of their velocities of flow, the width of the vessel on each side of the membrane should be enlarged at its top relative to its bottom as shown in Fig. 4. If required, the vessel can be widened its bottom relative to the top. By this means the pressure due to velocity of local flow of the liquids can be changed.

What I claim is:

1. A process of recovering caustic soda from waste lye by dialyzation wherein waste lye and water with or without an addition of a little quantity of alkali flow on each side of a membrane, in which a pressure effected by the difference of statical pressures and the difference of velocities of flow of the liquids is added to the liquids against the osmotic pressure acting on the membrane so as to have the membrane subjected to the least unbalanced pressure.

2. A process of recovering caustic soda from waste lye by dialyzation wherein waste lye and water with or without an addition of a little quantity of alkali flow on each side of a membrane, in which a pressure effected by the difference of statical pressures and the difference of velocities of flow of the liquids is added to the liquids against the osmotic pressure acting on the membrane and the widths of the liquids on both sides of the membrane are made different from each other so as to have the membrane subjected to the least unbalanced pressure.

3. A process of recovering caustic soda from waste lye by dialyzation wherein waste lye and water with or without an addition of a little quantity of alkali flow on each side of a membrane, in which a pressure effected by the difference of statical pressures and the difference of velocities of flow of the liquids is added to the liquids against the osmotic pressure acting on the membrane and the density of original alkaline water is increased up to 1% so as to have the membrane subjected to the least unbalanced pressure.

4. A process of recovering caustic soda from waste lye by dialyzation wherein waste lye and water with or without an addition of a little quantity of alkali flow on each side of a membrane, in which a pressure effected by the difference of statical pressures and the difference of velocities of flow of the liquids is added to the liquids against the osmotic pressure acting on the membrane and the width of the liquids on each side of the membrane is made different from its top to the bottom so as to have the membrane subjected to the least unbalanced pressure.

In testimony whereof I affix my signature.

SHOZO TACHIKAWA.